(12) United States Patent
Shan et al.

(10) Patent No.: US 12,196,134 B2
(45) Date of Patent: Jan. 14, 2025

(54) VENTILATION STRUCTURE OF CORE CHAMBER OF TURBOFAN ENGINE HAVING LARGE BYPASS RATIO AND VENTILATION METHOD THEREFOR

(71) Applicant: NANJING UNIVERSITY OF AERONAUTICS AND ASTRONAUTICS, Nanjing (CN)

(72) Inventors: Yong Shan, Nanjing (CN); Huali Yin, Nanjing (CN); Hao Liu, Nanjing (CN); Ming Deng, Nanjing (CN); Qiang Zhao, Nanjing (CN); Xiaoming Tan, Nanjing (CN); Jingzhou Zhang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/579,495

(22) PCT Filed: Apr. 22, 2022

(86) PCT No.: PCT/CN2022/088460
§ 371 (c)(1),
(2) Date: Jan. 15, 2024

(87) PCT Pub. No.: WO2023/284354
PCT Pub. Date: Jan. 19, 2023

(65) Prior Publication Data
US 2024/0328356 A1    Oct. 3, 2024

(30) Foreign Application Priority Data
Jul. 15, 2021    (CN) .......................... 202110801133.9

(51) Int. Cl.
F02C 7/18    (2006.01)
F02C 9/18    (2006.01)

(52) U.S. Cl.
CPC .................. *F02C 7/18* (2013.01); *F02C 9/18* (2013.01); *F05D 2260/608* (2013.01)

(58) Field of Classification Search
CPC ......... F05D 2260/608; F05D 2260/605; F02K 3/115
See application file for complete search history.

(56) References Cited

U.S. PATENT DOCUMENTS

2007/0245711 A1    10/2007  Stretton
2010/0146986 A1*    6/2010  Hussain .................... F02C 7/18
                                                           60/806

(Continued)

FOREIGN PATENT DOCUMENTS

| CN | 101479455 | 7/2009 |
|---|---|---|
| CN | 106555676 | 4/2017 |
| CN | 113606045 | 11/2021 |

*Primary Examiner* — Katheryn A Malatek
(74) *Attorney, Agent, or Firm* — Treasure IP group, LLC

(57) ABSTRACT

A ventilation structure of a core chamber of a turbofan engine having a large bypass ratio, said structure comprising: an outer bypass wall surface (1), a core chamber wall surface (4) and a core casing (7). An outer bypass flow channel (2) is formed between the outer bypass wall surface (1) and the core chamber wall surface (4). A core chamber (6) is formed between the core chamber wall surface (4) and the core casing (7). An air intake annular cavity (3) is provided in the core casing and is located at the upstream position. The air intake annular cavity (3) is used to put the outer bypass flow channel (2) and the core chamber (6) in communication. An exhaust grille (5) is further provided on the core chamber wall surface (4) and is located at a tail position.

4 Claims, 4 Drawing Sheets

(56) References Cited

U.S. PATENT DOCUMENTS

2015/0361891 A1    12/2015  Schwarz et al.
2016/0333728 A1    11/2016  Suciu et al.
2020/0300171 A1*  9/2020  Sawyers-Abbott ....... F02C 9/18
2022/0268212 A1*  8/2022  Baudoin ................... F02K 1/38

* cited by examiner

VENTILATION STRUCTURE OF CORE CHAMBER OF TURBOFAN ENGINE HAVING LARGE BYPASS RATIO AND VENTILATION METHOD THEREFOR

CROSS-REFERENCE TO RELATED APPLICATION

The present is national stage application of PCT application PCT/CN2022/088460, filed Apr. 22, 2022, entitled "VENTILATION STRUCTURE OF CORE CHAMBER OF TURBOFAN ENGINE HAVING LARGE BYPASS RATIO AND VENTILATION METHOD THEREFOR", which further takes claims priority from a Chinese Patent Application No. 202110801133.9, filed on Jul. 15, 2021, the entire contents of both applications are incorporated herein by reference in their entireties.

TECHNICAL FIELD

The present invention relates to the technical field of ventilation structures of core chambers of engines, and particularly to a ventilation structure of a core chamber of a turbofan engine having a large bypass ratio and a ventilation method thereof.

BACKGROUND ART

A core engine of a gas turbine engine needs to dissipate a large amount of heat while working normally. A high-temperature gas transmits heat to a core chamber in the forms of heat radiation and convective heat exchange, while the core engine exchanges heat inside in the forms of heat conduction, heat radiation and the like. Various heat exchange methods are coupled and affect each other, resulting in an increase in the temperature inside the core chamber of the engine. The high temperature in the core chamber will cause abnormal operations or damages of core engine components, and in serious cases, will directly affect the flight safety of an aircraft. Therefore, considering the life of accessories and structures in the core chamber, it is very important to design a suitable ventilation and cooling system scheme for a core chamber to provide airflow required for cooling the core chamber, thereby ensuring that the temperatures of the core chamber and a core casing are within a specified limit.

Sawyers-abbott et al. studied a core chamber ventilation device for an engine. The ventilation device consists of a fire-resistant sealing member (used to basically seal a core chamber in a gas turbine engine chamber), and a chimney (the chimney is constructed in a form of fluid communication with the fire-resistant sealing member to direct hot air from a core chamber to the external atmosphere through the fireproof sealing member). The device also provides a design scheme for a gas turbine engine and a chamber including a core chamber ventilation device. Vedeshkin et al. studied a test procedure that could measure hydraulic performances in components (e.g., a vent and a pressure relief door (PRD)) of an aero-engine chamber ventilation system, conducted testing using relevant experimental models, and finally compared and analyzed the obtained test results and testing results. The results showed that the calculated results of this test procedure were in good agreement with the testing results of the experimental model. Boileau et al. proposed a method for large eddy simulations on unstructured grids to better predict wall heat transfer in turbulent environments or typical aerospace applications with complex geometries. This method is used to study the coupling between periodic vortex shedding and wall heat transfer by phase averaging analysis. In recent years, Mohammadinia et al. then proposed an optimization method for ventilation and cooling of an aircraft piston engine based on a genetic algorithm. They analyzed ventilation and cooling principles of the aircraft piston engine by establishing an engine cooling model, and then used the genetic algorithm to optimize ventilation and cooling procedures of the aircraft piston engine. The results showed that this method could effectively optimize the ventilation and cooling scheme of the aircraft piston engine. In the optimization process, an average convergence value was always greater than 95.00%. The optimized ventilation and cooling scheme had a maximum failure rate of 0.03 under different operating conditions. In addition, the maximum failure rate was lower than that of other similar methods.

Domestic scholars have also conducted a large number of experimental studies on a ventilation and cooling system of an engine. Wang Xingtao et al. simplified a two-dimensional structure of a certain type of engine chamber and studied cooling effects on skin of the engine chamber from ventilation and cooling, radiation shielding, a thermal insulation layer, etc. of the engine chamber. Miao Guojun et al. studied a ventilation and cooling system in a turbofan engine nacelle of a civil aircraft, introduced a design scheme of the ventilation and cooling system, put forward design requirements and design content of the ventilation and cooling system, and gave a verification idea of the ventilation and cooling system. Zhang Yahai et al. proposed a simplified calculation method for ventilation and cooling performances of a power chamber based on rotor downwash flow for a power chamber ventilation and cooling system of a certain type of helicopter, calculated the performances of the power chamber ventilation and cooling system in a hovering state by using commercial CFD software, and analyzed the influences of a turbulence model, rotor downwash flow, engine heat dissipation rate and other factors on a temperature field of the power chamber and performances of an exhaust ejector. Wang Tao et al. summarized and introduced several air intake design schemes for several ventilation and cooling systems and their characteristics and sorted out and analyzed test flight results. Wang Yumei et al. analyzed an engine chamber temperature overrun fault of an aircraft and put forward a variety of schemes for an air intake mode of an engine chamber ventilation and cooling system according to an engine chamber temperature overrun phenomenon. Ma Wenchang et al. established a numerical calculation model of the spatial temperature distribution in an engine chamber of a certain type of aircraft, calculated the cooling of the engine chamber of this aircraft through two calculation methods of cold airflow and heat exchange in a nacelle, and compared and analyzed the calculation results to obtain a conclusion that has an engineering application value, which provides a theoretical basis for the design of the aircraft engine nacelle.

In engineering, a cooling structure of a core chamber of a turbofan engine having a large bypass ratio basically resides in that: an outer side wall of the core chamber of the engine, that is, an inner side wall of an outer bypass of the engine is provided with a hole to introduce an outer bypass airflow; and the introduced airflow takes away heat in the core chamber of the engine by means of convective heat exchange, and flows out from an annular slit at the end of the core chamber. Because this structure takes into account the outer bypass flow loss, on the one hand, the number of holes for the introduction of air in the wall surface should not be too much, which will bring about the unfavorable factor of uneven circumferential cooling in the core chamber; and on the other hand, this structure completely depends on a stamping air intake effect of outer bypass airflow, which inevitably affects the flow rate of introduced outer bypass air, and even does not reach a minimum amount of cooling air. In order to increase the amount of air introduction, only the number of holes for the introduction of air in the wall surface is increased, so as to increase the bypass flow loss. The above two points affect each other and cannot be reconciled. Therefore, the present invention patent proposes a ventilation structure of a core chamber of a turbofan engine having a large bypass ratio, which is additionally equipped with an air intake annular cavity, exhaust grilles and other structures, which are expected to make up for the shortcomings of a cooling structure of a core chamber of the current turbofan engine having a large bypass ratio.

SUMMARY OF THE INVENTION

In view of this, an object of the present invention is to provide a ventilation structure of a core chamber of a turbofan engine having a large bypass ratio and a ventilation method thereof. Based on air intake and exhaust of the existing small holes, outer bypass cooling airflow which is introduced by a stamping air intake effect can enter the core chamber uniformly in a circumferential direction by introducing a structural design of an air intake annular cavity and a set of exhaust grilles. Meanwhile, a flow direction of the cooling airflow in the core chamber after the cooling airflow is introduced from an outer bypass can be effectively adjusted, so as to achieve a better flow heat exchange effect in the chamber. In addition, a suction effect of the outer bypass airflow makes air in the core chamber easier to exhaust, thereby achieving a better exhausting effect.

In order to fulfill the above object, the present invention adopts the following technical solution.

A ventilation structure of a core chamber of a turbofan engine having a large bypass ratio includes:
  an outer bypass wall surface (1), a core chamber wall surface (4), and a core casing (7), wherein an outer bypass flow channel (2) is formed between the outer bypass wall surface (1) and the core chamber wall surface (4), and a core chamber (6) is formed between the core chamber wall surface (4) and the core casing (7); and
  an air intake annular cavity (3) is provided in the core chamber and is located at an upstream position; the air intake annular cavity (3) is used to put the outer bypass flow channel (2) and the core chamber (6) in communication, and exhaust grilles (5) are further arranged on the core chamber wall surface (4) and at a tail position; and the exhaust grilles (5) are used to exhaust cooling air inside the core chamber (6) into the outer bypass flow channel (2).

Further, the air intake annular cavity (3) has an annular hollow cavity body inside, and has a central axis that coincides with a central axis (8) of the core chamber (6); a side wall of the air intake annular cavity (3) coincides with the core chamber wall surface (4), and is uniformly provided with a plurality of small air intake holes (9); a circle of continuous and inwardly concave inclined planes are arranged at an exhaust side of the air intake annular cavity (3); each inclined plane is an annular cavity end surface (10); and a plurality of small exhaust holes (11) is also uniformly formed in the annular cavity end surface (10).

Further, the number of the small air intake holes (9) ranges from 4 to 6.

Further, a plurality of exhaust grilles (5) is uniformly arranged on the core chamber wall surface (4) in a circumferential direction; and the exhaust grilles (5) are of a multi-layer sheet-like structure with a plurality of blades; and
  the blades are not lapped each other in a radial direction, and have a gap therebetween; in an axial direction, the tails and heads of the blades are overlapped; and the tail of each upstream blade is positioned outside the front end of the downstream blade, so that a fluid area of the core chamber (6) and a fluid area of the outer bypass flow channel (2) are interpenetrated.

A ventilation method of a ventilation structure of a core chamber of a turbofan engine having a large bypass ratio includes the following steps:
  S1: utilizing a stamping effect to allow an outer bypass airflow in an outer bypass flow channel (2) to flow into a cavity body of an air intake annular cavity (3) through small air intake holes (9) in a core chamber wall surface (4);
  S2: allowing cooling airflow to enter into the cavity body of the air intake annular cavity (3) and then flow in a circumferential direction, and then uniformly into the core chamber (6) in the circumferential direction at a defined angle from small exhaust holes (11) in the annular cavity end surface (10) of the air intake annular cavity (3); and
  S3: allowing the cooling airflow to flow backward inside the core chamber (6), and to be exhausted into the outer bypass flow channel (2) from exhaust grilles (5).

The present invention has the following beneficial effects.
1. Based on air intake from the small holes, the present invention introduces an air intake annular cavity structure, so that the outer bypass cooling airflow flows into the air intake annular cavity in a radial direction through the small air intake holes in the core chamber wall surface, first flows in the circumferential direction in the air intake annular cavity, and then enters the core chamber uniformly in the circumferential direction from the small exhaust holes in the annular cavity end surface.
2. The annular cavity end surface of the air intake annular cavity is designed into an annular surface on which a normal direction and the central axis of the core chamber have a defined angle which is less than 90 degrees, so that a flow direction of the airflow after the introduction of cooling airflow can be effectively adjusted. Therefore, the outer bypass cooling airflow can flow into the core chamber at a defined angle, so as to better achieve the purpose of cooling the surface of a core casing and a better in-cabin flow heat exchange effect.
3. The design of the exhaust grilles in the present invention has increased a suction effect which is produced by using the outer bypass air to flow through the exhaust grilles based on the original method of impelling air to be exhausted depending on an air intake pressure of the core chamber, so that the air in the core chamber is easier to exhaust, and is mixed with the outer bypass airflow in the outer bypass flow channel, thereby achieving a better exhausting effect.

1—outer bypass wall surface; 2—outer bypass flow channel; 3—air intake annular cavity; 4—core chamber wall surface; 5—exhaust grille; 6—core chamber; 7—core casing; 8—central axis of core chamber; 9—small air intake hole; 10—annular cavity end surface; 11—small exhaust hole.

DETAILED DESCRIPTION OF THE INVENTION

In order to make the objects, technical solutions and advantages of the embodiments of the present invention more clearly, the technical solutions in the embodiments of the present invention will be described clearly and completely in conjunction with the accompanying drawings in the embodiments of the present invention. Apparently, the described embodiments are merely some embodiments, rather than all embodiments, of the present invention. Based on the embodiments of the present invention, all other embodiments derived by a person of ordinary skill in the art without creative efforts shall fall within the protection scope of the present invention.

Embodiment 1

Figure 1:
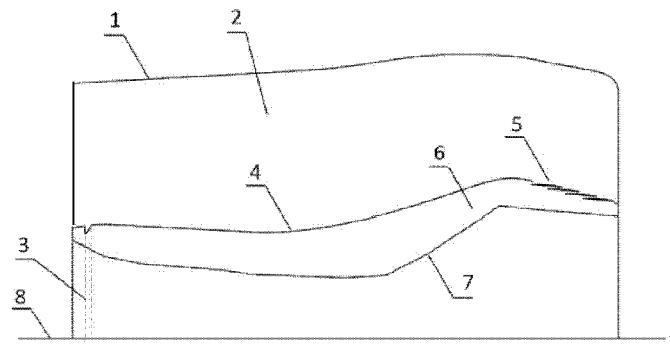
FIG. 1 is a two-dimensional schematic diagram of a ventilation structure of a core chamber of an engine as provided in Embodiment 1.
Figure 2:
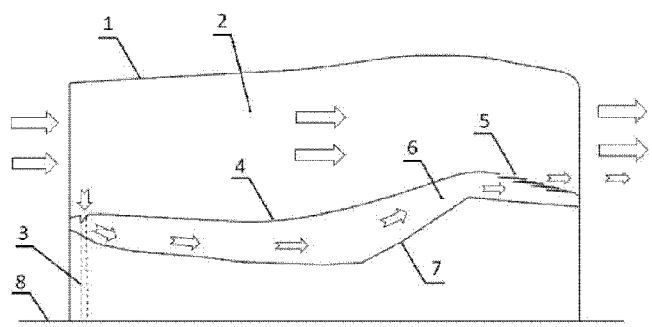
FIG. 2 is a schematic principle diagram of the ventilation structure of the core chamber of the engine as provided in Embodiment 1.
Figure 3:
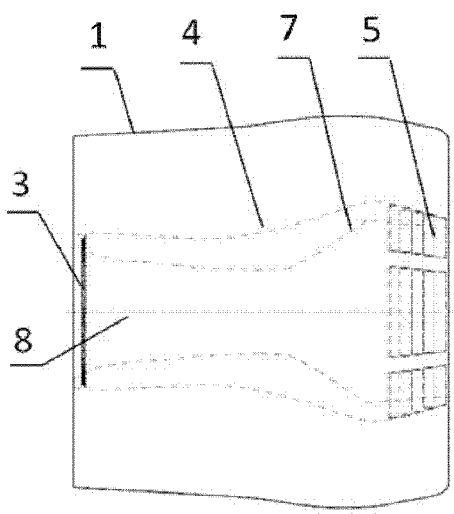
FIG. 3 is a schematic structural diagram of a core chamber with an outer bypass.
Figure 4:
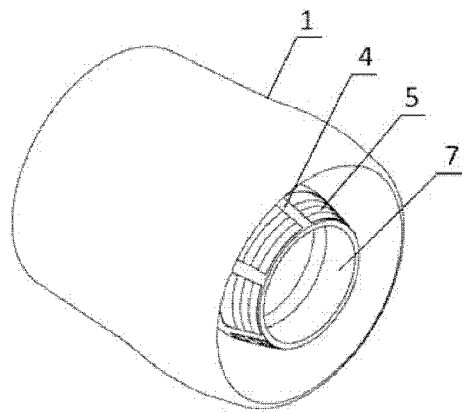
FIG. 4 is a schematic structural diagram of a core chamber with an outer bypass.
Figure 5:
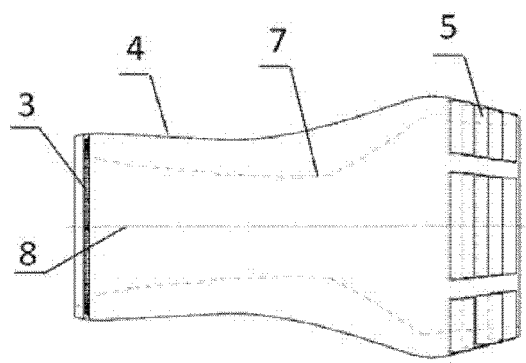
FIG. 5 is a schematic structural diagram of a core chamber without an outer bypass.
Figure 6:
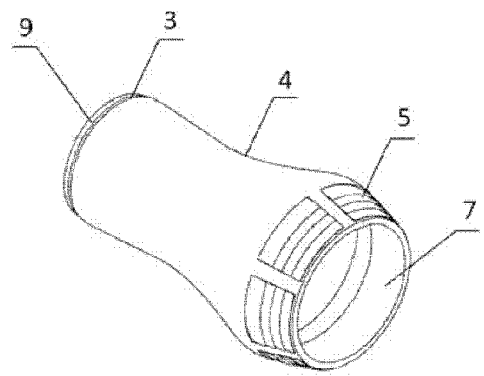
FIG. 6 is a schematic structural diagram of a core chamber without an outer bypass.
Figure 7:
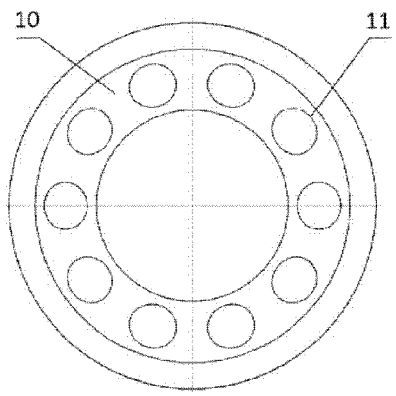
FIG. 7 is a front view of an air intake annular cavity.
Figure 8:
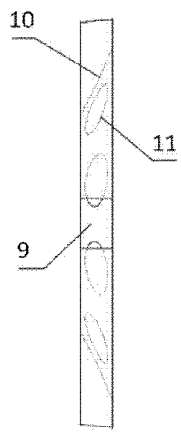
FIG. 8 is a side view of the air intake annular cavity.
Figure 9:
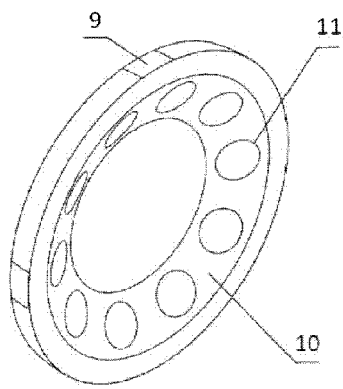
FIG. 9 is a schematic structural diagram of the air intake annular cavity.
Figure 10:
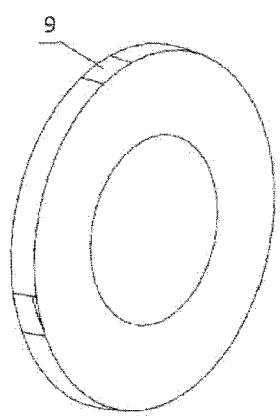
FIG. 10 is a schematic structural diagram of the air intake annular cavity.

Referring to FIGS. 1 to 10, this embodiment provides a ventilation structure of a core chamber of a turbofan engine having a large bypass ratio. This structure includes:

an outer bypass wall surface 1, a core chamber wall surface 4, and a core casing 7, wherein an outer bypass flow channel 2 is formed between the outer bypass wall surface 1 and the core chamber wall surface 4, and a core chamber 6 is formed between the core chamber wall surface 4 and the core casing 7; and an air intake annular cavity 3 is provided in the core chamber and is located at an upstream position; the air intake annular cavity 3 is used to put the outer bypass flow channel 2 and the core chamber 6 in communication, and exhaust grilles 5 are further arranged on the core chamber wall surface 4 and at a tail position; and the exhaust grilles 5 are used to exhaust cooling air inside the core chamber 6 into the outer bypass flow channel 2.

Specifically, in this embodiment, the air intake annular cavity 3 has an annular hollow cavity body inside, and has a central axis that coincides with a central axis 8 of the core chamber 6; a side wall of the air intake annular cavity 3 coincides with the core chamber wall surface 4, and is uniformly provided with 4 to 6 small air intake holes 9; a circle of continuous and inwardly concave inclined planes are arranged at an exhaust side of the air intake annular cavity 3; each inclined plane is an annular cavity end surface 10; a plurality of small exhaust holes 11 is also uniformly formed in the annular cavity end surface 10; and an included angle between the annular cavity end surface 10 and the central axis 8 of the core chamber is less than 90 degrees. More specifically, the annular cavity end surface of the air intake annular cavity in this embodiment is designed into an annular surface on which a normal direction and the central axis of the core chamber have a defined angle which is less than 90 degrees, so that a flow direction of the airflow after the introduction of cooling airflow can be effectively adjusted. Therefore, the outer bypass cooling airflow can flow into the core chamber at a defined angle, so as to better achieve the purpose of cooling the surface of a core casing and a better in-cabin flow heat exchange effect.

Specifically, in this embodiment, a plurality of exhaust grilles 5 is uniformly arranged on the core chamber wall surface 4 in a circumferential direction; and the exhaust grilles 5 are of a multi-layer sheet-like structure with a plurality of blades. The blades are not lapped each other in a radial direction, and have a gap therebetween. In an axial direction, the tails and heads of the blades are overlapped; and the tail of each upstream blade is positioned outside the front end of the downstream blade, so that a fluid area of the core chamber 6 and a fluid area of the outer bypass flow channel 2 are interpenetrated. More specifically, the exhaust grilles provided in this embodiment have increased a suction effect which is produced by using the outer bypass air to flow through the exhaust grilles based on an original method of impelling air to be exhausted depending on an air intake pressure of the core chamber, so that the air in the core chamber is easier to exhaust, and is mixed with the outer bypass airflow in the outer bypass flow channel, thereby achieving a better exhausting effect.

Embodiment 2

Based on Embodiment 1, this embodiment provides a ventilation method of a core chamber of a turbofan engine having a large bypass ratio based on the ventilation structure of the core chamber of the turbofan engine having the large bypass ratio as provided by Embodiment 1. This method specifically includes the following steps:

1: utilizing a stamping effect to allow an outer bypass airflow in an outer bypass flow channel 2 to flow into a cavity body of an air intake annular cavity 3 connected to a core chamber wall surface 4, through small air intake holes 9 in the core chamber wall surface 4;

2: allowing cooling airflow to enter into the cavity body of the air intake annular cavity 3 and then flow in a circumferential direction, and then uniformly into the core chamber 6 in the circumferential direction from small exhaust holes 11 in the annular cavity end surface 10 of the air intake annular cavity 3, wherein the annular cavity end surface 10 of the air intake annular cavity 3 has an inclined angle, so that the cooling airflow can flow to the core chamber 6 at a defined angle, thereby achieving a purpose of cooling the surface of a core casing better, and a better in-cabin flow heat exchange effect; and 3: allowing the cooling airflow to flow backward inside the core chamber 6, and to be exhausted into the outer bypass flow channel 2 from the exhaust grilles 5, wherein a suction effect of the outer bypass airflow makes air in the core chamber 6 easier to exhaust and is mixed with outer bypass airflow in the outer bypass flow channel 2.

The content that has not been detailed in the present invention is well-known for those skilled in the art.

The specific preferred embodiments of the present invention are described in detail above. It should be understood that a person of ordinary skill in the art can make many modifications and changes according to the conception of the present invention without creative labor. Therefore, all technical solutions that can be obtained by a person skilled in the art through logical analysis, reasoning, or limited experiments on the basis of the prior art in accordance with the conception of the present invention shall be within the protection scope as determined by the claims.

We claim:

1. A ventilation structure of a core chamber of a turbofan engine having a bypass ratio, comprising:
    an outer bypass wall surface (1),
    a core chamber wall surface (4), and
    a core casing (7),
    wherein
        an outer bypass flow channel (2) is formed between the outer bypass wall surface (1) and the core chamber wall surface (4), and a core chamber (6) is formed between the core chamber wall surface (4) and the core casing (7); and
        an air intake annular cavity (3) is provided in the core chamber and located at an upstream position;
        the air intake annular cavity (3) provides fluid communication between the outer bypass flow channel (2) and the core chamber (6), and exhaust grilles (5) are further arranged on the core chamber wall surface (4) and at a tail position; and
        the exhaust grilles (5) are used to exhaust cooling air inside the core chamber (6) into the outer bypass flow channel (2);
        the air intake annular cavity (3) has an annular hollow cavity body inside, and has a central axis that coincides with a central axis (8) of the core chamber (6); a side wall of the air intake annular cavity (3) coincides with the core chamber wall surface (4), and is uniformly provided with a plurality of air intake holes (9); a circle of continuous and inwardly concave inclined planes are arranged at an exhaust side of the air intake annular cavity (3); each inclined plane is an annular cavity end surface (10); and a plurality of exhaust holes (11) is also uniformly formed in the annular cavity end surface (10).

2. The ventilation structure of the core chamber of the turbofan engine having the bypass ratio according to claim 1, wherein the number of the air intake holes (9) ranges from 4 to 6.

3. The ventilation structure of the core chamber of the turbofan engine having the bypass ratio according to claim 1, wherein
    the exhaust grilles (5) is uniformly arranged on the core chamber wall surface (4) in a circumferential direction; and the exhaust grilles (5) are of a multi-layer sheet-like structure with a plurality of blades; and
    the blades are not lapped with each other in a radial direction, and have a gap therebetween;
    in an axial direction, tails and heads of the blades are overlapped; and the tail of each upstream blade is positioned outside the front end of the downstream blade, so that a fluid area of the core chamber (6) and a fluid area of the outer bypass flow channel (2) are interpenetrated.

4. A ventilation method of the ventilation structure of the core chamber of the turbofan engine having the bypass ratio according to claim 1, comprising the following steps:
    providing the ventilation structure of the core chamber of the turbofan engine having the large bypass ratio of claim 1;
    step 1: utilizing a stamping effect to allow an outer bypass airflow in the outer bypass flow channel (2) as the cooling air to flow into the annular hollow cavity body of the air intake annular cavity (3) through the air intake holes (9) in the core chamber wall surface (4);
    step 2: allowing the cooling air to enter into the cavity body of the air intake annular cavity (3) and then flow in a circumferential direction, and then uniformly into the core chamber (6) in the circumferential direction at a defined angle from the exhaust holes (11) in the annular cavity end surface (10) of the air intake annular cavity (3); and
    step 3: allowing the cooling airflow to flow backward inside the core chamber (6), and to be exhausted into the outer bypass flow channel (2) from the plurality of exhaust grilles (5),
    wherein the steps occurs sequentially from step 1 to step 3.

* * * * *